United States Patent [19]

Takai

[11] 4,374,401
[45] Feb. 15, 1983

[54] TAPE PLAYER

[75] Inventor: Kazuki Takai, Toda, Japan

[73] Assignee: Clarion Co., Ltd., Tokyo, Japan

[21] Appl. No.: 86,054

[22] Filed: Oct. 18, 1979

[30] Foreign Application Priority Data

Oct. 20, 1978 [JP] Japan ............................ 53-143326[U]
Oct. 26, 1978 [JP] Japan ............................ 53-146436[U]
Mar. 12, 1979 [JP] Japan .................................. 54-27639

[51] Int. Cl.³ ........................ G11B 15/18; G11B 23/10
[52] U.S. Cl. ................................. 360/96.5; 360/96.6;
360/71
[58] Field of Search .................... 360/96.5, 96.6, 96.1,
360/93, 105, 71, 137; 242/198-201

[56] References Cited

U.S. PATENT DOCUMENTS

| 3,902,193 | 8/1975 | Hapke ............................... 360/96.6 |
| 3,987,486 | 10/1976 | Ito et al. ........................... 360/96.5 |
| 4,115,826 | 9/1978 | Takagi et al. ..................... 360/96.5 |
| 4,136,367 | 1/1979 | Righi ................................ 360/96.5 |
| 4,167,997 | 8/1979 | Sugihara ............................ 360/137 |
| 4,224,647 | 9/1980 | Umezawa et al. .............. 360/105 X |

Primary Examiner—John H. Wolff
Attorney, Agent, or Firm—Wallenstein, Wagner, Hattis, Strampel & Aubel

[57] ABSTRACT

A tape player wherein a slide member disposed on a receiving frame provided on a deck is adapted to slide upon loading of a tape pack so as to operate a lift member disposed on said deck and lock the member in a recording/reproducing position. A lock member operative upon actuation of the slide member has an attractable member which is adapted to be attracted by an electromagnetic mechanism provided on the deck.

7 Claims, 18 Drawing Figures

TAPE PLAYER

TECHNICAL FIELD OF THE INVENTION

This invention generally relates to a tape player, and more particularly to an improvement in a lock mechanism and an eject mechanism for a tape player.

BACKGROUND OF THE INVENTION

It has been already known that tape pack loading or unloading operation is utilized to actuate a lift plate on which a head and a pinch roller are mounted to put them into positions for recording/reproducing mode or for achieving ejection of the tape pack. However, in the known mechanism, it is necessary to accurately put and lock the lift plate etc. in a position for the recording/reproducing mode at the last stage of the loading of the tape pack. To this end, it is required to interlock the lock mechanism at the last stage of the loading for establishing a precise locking. Thus, a considerably large operational force is required at the last stage of the loading where the retreat stroke of the tape pack left is small. Furthermore, over-push is generally required to accomplish the locking. For these reasons, it is difficult to establish the sure locking. In addition, a mechanism which is specifically adapted to attain such a sure locking generally has a drawback that there is a difficulty in release of the locking when ejection of the tape pack is desired.

SUMMARY OF THE INVENTION

It is therefore an object of the present invention to provide a tape player which is free from the disadvantages involved in the known art.

It is another object of the present invention to provide a tape player incorporating therein an electromagnetic plunger of pulling type in a lock mechanism thereof for achieving sure locking by a relatively easy operation and yet achieving release of the locking and ejection of the tape pack easily and smoothly.

In accordance with the present invention, there is provided a tape player which comprises:

a deck having magnetic recording/reproducing means;

a receiving frame provided on said deck;

a slide member slidable according to loading of a tape pack;

a lift member provided on said deck and adapted to be raised or lowered in response to the sliding of said slide member;

a lock member operative upon sliding of said slide member;

an attractable member provided on said lock member; and electromagnetic lock means provided on said deck;

said attractable member being adapted to be attracted by the electromagnetic means to hold said lift member at a predetermined position.

BRIEF DESCRIPTION OF THE DRAWINGS

FIGS. 7 A–D is an explanatory view showing an operational relation between guide slots and engaging pins of the respective operating levers;

PREFERRED EMBODIMENTS OF THE INVENTION

Figure 1:
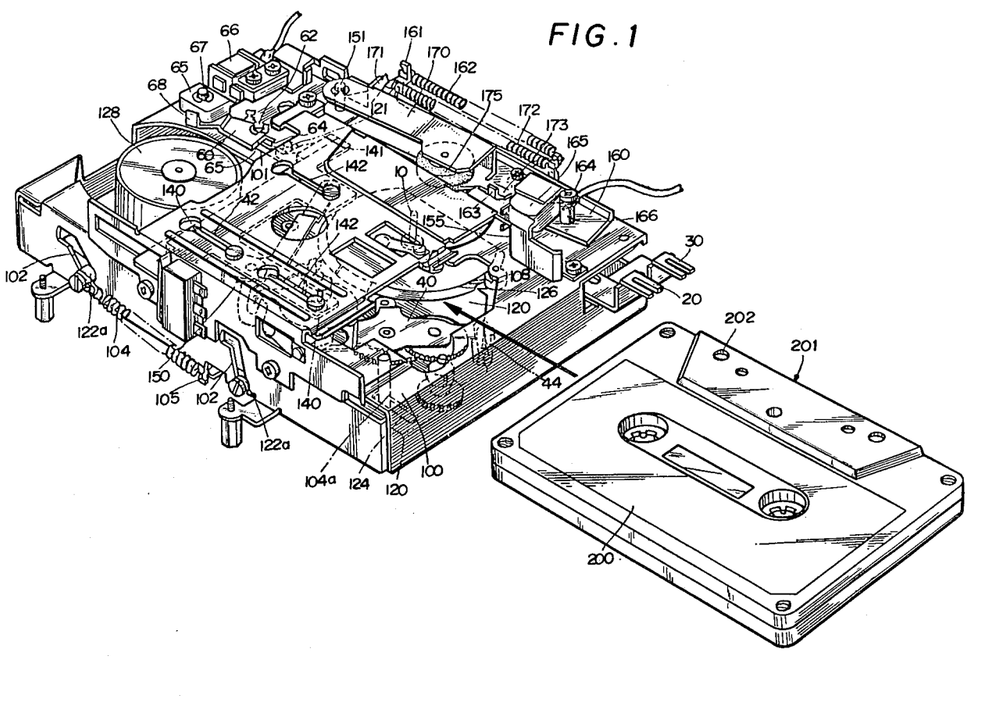
FIG. 1 is a perspective view of one form of a tape player in accordance with the present invention.
Figure 2:
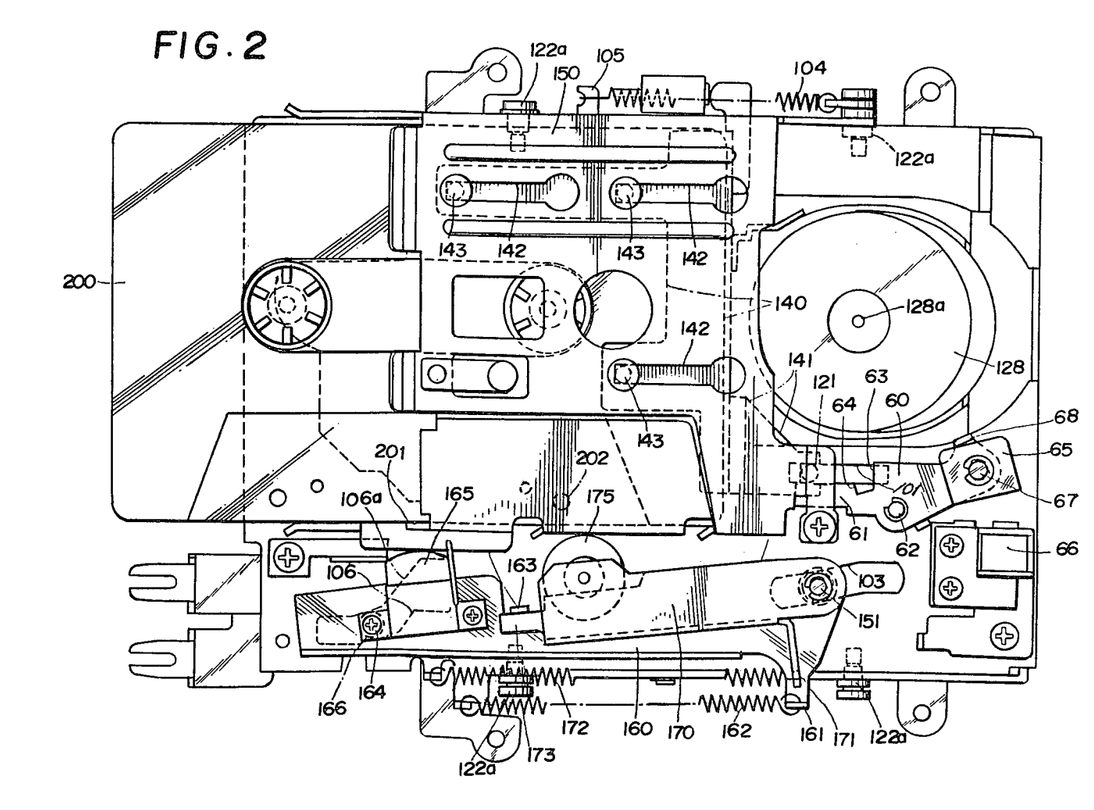
FIG. 2 is a plan view of the tape player illustrated in FIG. 1, showing a state just before the tape pack is loaded.
Figure 3:
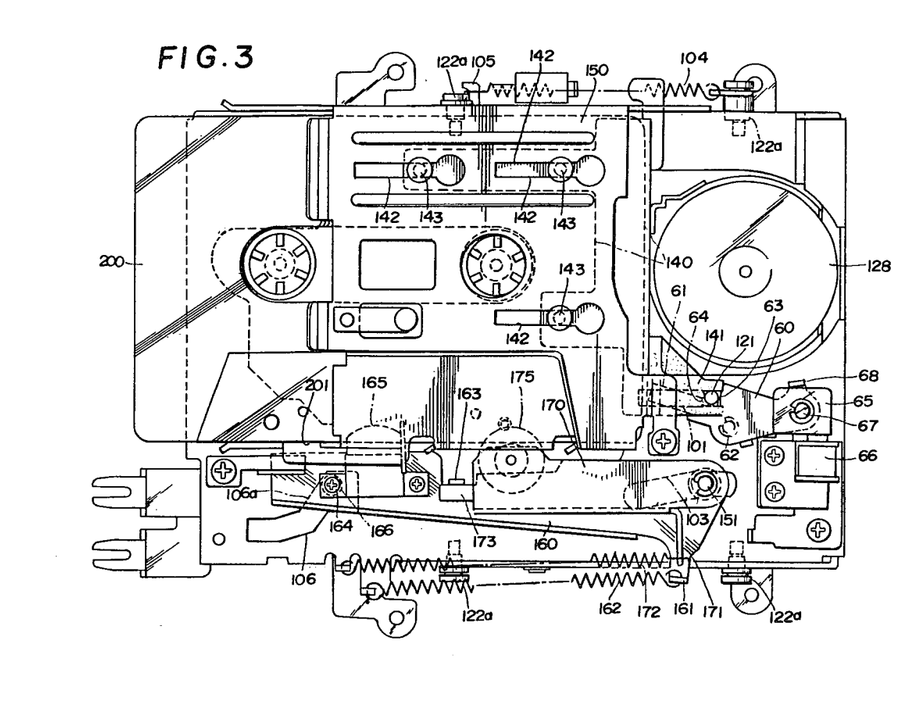
FIG. 3 is a plan view of the tape player illustrated in FIG. 1, showing a state after completion of loading of the tape pack.

Referring now to FIGS. 1 to 9 there is illustrated a preferred embodiment of the invention. As illustrated in FIG. 1, a receiving frame 150 is provided on a deck 100 into which and out of which two-reel cassette type tape pack 200 (hereinafter referred to as "cassette") is loaded and unloaded with the shorter sides thereof facing forwardly and rearwardly. On one side of the receiving frame 150, there are provided a head plate 160 and a pinch roller frame 170 which are supported by a common shaft 151 at their respective ends. The common shaft 151 is formed on a lift plate 120 at the interior portion thereof. The shaft 151 is slidable vertically and horizontally through engagement between an engaging member 29 and a cooperative slot 28. The lift plate 120 has an engaging pin 121 (FIGS. 2-3) which engages with an engaging member 141 provided at a rear end of a slide frame 140 mounted on the receiving frame 150 so as to slide forwardly and rearwardly. Upon insertion and rearward movement of the cassette 200 into the receiving frame 150, pins 143 of the slide frame 140 are pushed backwardly in respective guide slots 142. The lift plate 120 is then pushed rearwardly and raised through the pin 121 by a guide through engagement between pins 122a provided on opposite sides of the lift plate 120 and diagonal guide slots 102, 102 (FIG. 1) formed on a sidewall of the deck 100. The pin 121 retreats within a slot 101 (FIG. 3) formed on the deck 100. In the present embodiment, a lock member 60 is provided along the slot 101 and pivotally supported intermediate thereof on the deck 100 by a pin 62 at a position interior of the slot 101. The lock member 60 has an engaging arm portion 61 at a forward portion thereof which extends generally along the guide slot 101 as illustrated in FIGS. 2 and 3. An engaging step 63 is formed on the lock member 60 at a position forward of the pin 62 and a lock portion 64 is further formed on the lock member 60 at a position forward of the engaging step 63. Thus, it will be seen that the pin 121 acts on the engaging step 63 at the last stage of its retreat course to rotate the lock member 60 clockwise as seen in FIG. 3 and put the pin 121 into the lock portion 64. The lock member 60 includes an attractable member 65 at a position interior of the lock member 60. A lock electromagnetic mechanism 66 is provided on the deck 100 in association with the attractable member 65. In the retreat course of the slide frame 140, a normally open switch mechanism 95 which is provided on the side of the deck 100 is closed to allow the electromagnetic mechanism 66 to conduct so that the mechanism 66 pulls the attractable member 65 adjacent thereto. Then, the pin 121 engages with the step 63 of the lock portion 64, attaining a positive locking as illustrated in FIG. 3. At the same time, the lift plate 120 is held at a raised position, keeping the cassette 200 at its innermost loaded position. The attractable member 65 is pivotally connected to the rear end portion of the lock member 60 by a shaft 67. A stopper 68 is formed on the lock member 60 so as to prevent over-rotation of the attractable member 65 so that the electromagnetic mechanism 66 may surely pull and attract the attractable member 65 without failure.

The heat plate 160 has a hook 161 at a forward end thereof. A tension spring 162 is provided between the hook 161 and the deck 100. The head plate 160 has a bend 163 intermediate thereof which is adapted to abut against a projected portion 173 formed at a forward end portion of the pinch roller frame 170. Another tension spring 172 is provided between a hook 171 formed adjacent to the pivotal point of the pinch roller frame 170 and the deck 100 so as to extend in parallel with the tension spring 162. A head 165 is mounted on the head plate 160 at a position forward of the bend 163. A pinch roller 175 is mounted on the pinch roller frame 170. The head 165 and the pinch roller 175 are disposed in an opening 155 (FIG. 1) formed on one side of the receiving frame 150 and are adapted to advance towards a recording/reproducing face 201 of the cassette 200 put in the receiving frame 150. To advance and return the head 165 and the pinch roller 175, an operating shaft 166 (FIGS. 2-3) coaxial with a shaft 164 for mounting the head 165 thereon is provided so as to project from the lower face of the head plate 160. The shaft 166 is received in a cam slot 106 formed on the deck 100. In the course where the cassette 200 is inserted and locked in the rearmost loaded position of the receiving frame 150, the lift plate 120 retreats with the cassette within the limit of the length of the guide slot 102, 102. The head plate 160 and the pinch roller frame 170 are also brought backwardly through the common shaft 151 which engages with the lift plate 120. The holding of the operating shaft 166 by a cam edge 106a of the cam slot 106 is released so that the head 165 and the pinch roller 175 are advanced into the opening 155 by the action of the spring 162. On the other hand, when the cassette 200 is unloaded, the cam edge 106a acts to guide the operating shaft 166 so as to bring the head 165 and the pinch roller 175 away from the opening.

The common shaft 151 engages with a crooked guide slot 103 of the deck 100 through a roller coaxial with the common shaft 151. The common shaft 151 further engages with the lift plate 120 through the engagement of another roller also coaxial with the shaft 151 with a lateral guide slot for lateral movement. Therefore, when the lift plate 120 is advanced and raised, the common shaft 151 is drawn a bit from the position illustrated in FIG. 2 towards the receiving frame 150 along the guide slot 103 and brought into a position illustrated in FIG. 2. Thus, not only the pinch roller frame 170 but also the head plate 160 is drawn to the receiving frame 150 so that the head 165 may accurately press against a tape. When the head plate 160 and the pinch roller frame 170 return, the head 165 and the pinch roller 175 are separated from the tape or the cassette 200. The lift plate 120 has a recessed portion 126 projected upwardly for receiving a flywheel therein. The flywheel is fitted to the lower face of the lift plate 120 so as to be located in the recessed portion 126. A capstan 10 coaxial with the flywheel is raised or lowered with the lift plate 120 and put into a hole 202 of the cassette 200 inserted in the receiving frame 150. The pinch roller 175 is adapted to press through the tape against the capstan in a position to effect a desired tape feeding. 104a is a guide shaft which is inserted in a guide slot 124 formed on the lift plate 120 to guide raising and lowering of the lift plate 120.

Figure 4:
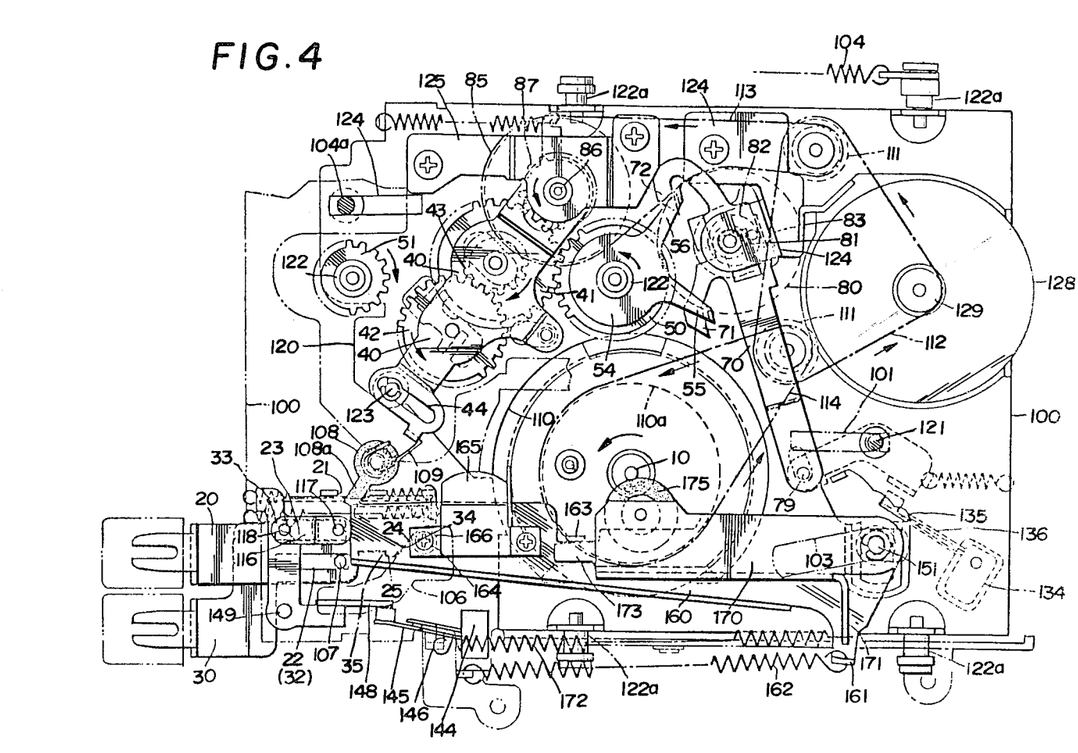
FIG. 4 is a plan view of the tape player illustrated in FIG. 1, showing an operating lever mechanism portion thereof.

A first operating lever 20 is provided at a side portion of the deck 100 for effecting a fast feed operation and provided with a resetting spring 23. Upon depression of the lever 20, a rock member 108 in a position of FIG. 4 is caused to rotate. A tip end portion of a changeover plate 40 is then rotated around a shaft 86. As a result, an interlocking rotator 42 is brought into mesh with a small gear 51 associated with another reel drive member 122. A second operating lever 30 is provided adjacent to the first operating lever 20 at a position outer than the lever 20. The second operating lever 30 is bent inwardly in a horizontal direction. An elongated slot 32 formed on the second operating lever 30 registers with an elongated slot 22 of the first operating lever 20. These slots 22 and 32 engage with guide pins 107, 107 so as to allow the respective levers to slide therein. A resetting spring 33 is provided between the lever 30 and the deck 100. The levers 20 and 30 have, at their respective tip ends, diagonal edges 24 and 34. These diagonal edges 24 and 34 are adapted to abut against the operating shaft 166 of the head plate 160. When either one of or both of the levers 20 and 30 are depressed, the head plate 160 is retired from the position of FIG. 4 through the operating shaft 166. Accordingly, the pinch roller frame 170 is also retired rotated around the common shaft 151. Thus, the head 165 and the pinch roller 175 are removed from the capstan 10 and the tape face. When both of the levers 20 and 30 are depressed, a pin 117 of a link 116 is pinched between edges 27 and 37 formed in guide slots 26 and 36 of the levers 20 and 30, respectively, to interlock the link 116. An L-shaped link 147 is rotated to actuate, by an operating portion thereof, a contact member 145 of a switch 144 incorporated in a circuit associated with the electromagnetic mechanism 66 to open the switch 144. Upon opening of the switch 144, the attraction of the attractable member 65 is released so that the lock member 60 is rotated from the position of FIG. 3 to return the pin 121 to its original position. Release of the locking is thus attained.

In accordance with this embodiment of the invention, the lift plate 120 is operated in response to the loading and unloading of the cassette 200 for establishing and locking a recording/reproducing mode of operation. More specifically, the slide frame 140 is adapted to slide with the cassette 200 to operate the lock member 60 having the attractable member 65 attached thereto and adapted to be attracted and locked by the electromagnetic mechanism 66. Thus, sure locking is further assured. Moreover, this embodiment eliminates a difficulty in pushing of the cassette 200 at the last stage of the loading and a necessity of overpushing of the cassette for locking, providing a simple and smooth loading and locking operation. In addition, since pulling force by the electromagnetic mechanism is utilized in the locking, the mechanical structure for locking can be simplified. Therefore, ejection can also be readily carried out simply by cutting off a current.

An operating lever mechanism in the tape player of the present invention will now be described.

In general, a tape player requires various operations such as eject, rewind, stop, switch operations, etc. These operations are generally carried out by separate operating levers. Therefore, operating levers as many as the operations are required and misoperation due to mis-selection of the levers is possibly caused. Where two adjacent levers are wrongly depressed concurrently, a mechanism of the tape player are possibly subject to damage or deformation, causing undesired misoperation or fatal damage of the entire mechanism of the tape player.

In a preferred form of the tape player of the present invention, there is further provided a mechanism which comprises two operating levers each adapted to effect respective operations when depressed separately and adapted to effect further operation when depressed conjointly.

Figure 5:
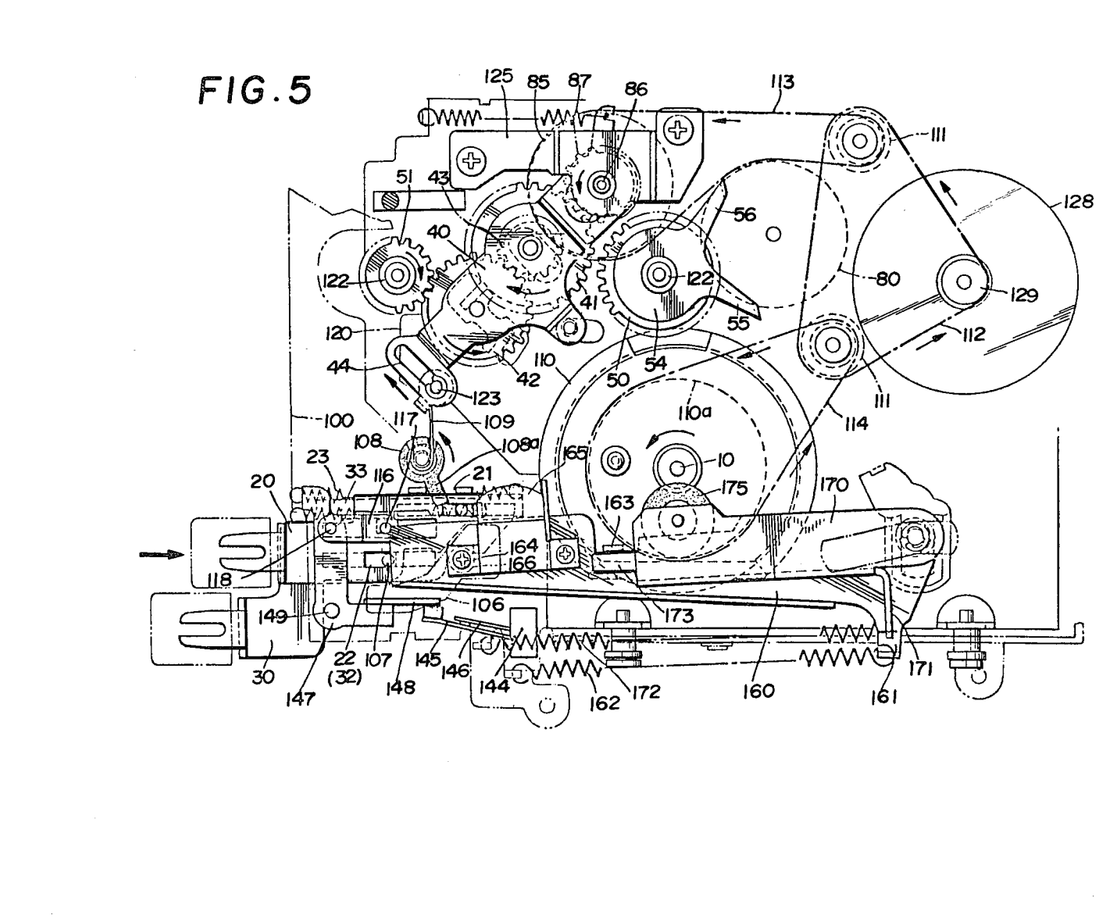
FIG. 5 is a plan view of the tape player illustrated in FIG. 1, showing a state where a first operating lever has been depressed.

Two reel drive members 122 and a motor 128 are provided on the lift plate 120. Around one of the reel drive members 122 there is provided coaxially therewith a take-up rotator 50 having a gear around its periphery as illustrated in FIG. 4 and 5. The take-up rotator 50 rotates in a regular direction when it is in mesh with an intermediate rotator 41 as illustrated in FIG. 4. On the other hand, in a state of FIG. 5 where the small gear 51 coaxial with another reel drive member 122 is in mesh with an interlocking rotator 42 interlocked through the intermediate rotator 41 and a small gear 43 integral therewith, said another reel drive member 122 is rotated and said one of the reel drive members 122 idles to establish a reverse feed mode. A first drive belt 112 is wound between a motor pulley 129 and two sub-pulleys 111, 111 provided on the lower face of the lift plate 120, and a second drive belt 113 is wound between one of the sub-pulley 111 and a transmission rotator 85 provided on the lift plate 120 by a pivotal seat 125. The transmission rotator 85 has a small gear 87 coaxial therewith which is adapted to mesh with the intermediate rotator 41. Thus, the rotational drive from a motor 128 is transmitted to the take-up rotator 50 and the intermediate rotator 41. The intermediate rotator 41 is supported at a base end portion of the changeover plate 40 adapted to rotate around a shaft 86 of the transmission rotator 85. The changeover plate 40 has the interlocking rotator 42 intermediate thereof and an elongated guide slot 44 at a tip end portion thereof which is engaged with a pin 123 of the lift plate 120 so as to slide relative to the lift plate 120. The tip end of the changeover plate 40 has an operating portion 45 bent downwardly which is adapted to abut against a resilient member 109 of the rock member 108 provided on the bottom of the deck 100.

The rock member 108 has a projection 108a which is received in an engaging portion 21 formed on a side of the first operating lever 20. The lever 20 is slidable relative to the deck 100 through an engagement of the guide pin 107 of the deck 100 and the elongated slot 22 of the lever 20. A resetting spring 23 is provided between the lever 20 and the deck 100.

The general operations of the first and second operating levers are as mentioned above. The operating lever 20 and/or the operating lever 30 is held at the depressed position through an engagement of a step 25 and/or a step 35 (FIG. 6) formed at a base portion or portions of the diagonal edge or edges 24, 34 with the operating shaft 166. However, when the operating lever 30 (or 20) is depressed under conditions where the operating lever 20 (or 30) is engaged, the engagement of the lever 20 (or 30) is released. Thus, the engagement can be readily released and the operating lever can be reset from its depressed position by a relatively small force.

Figure 6:
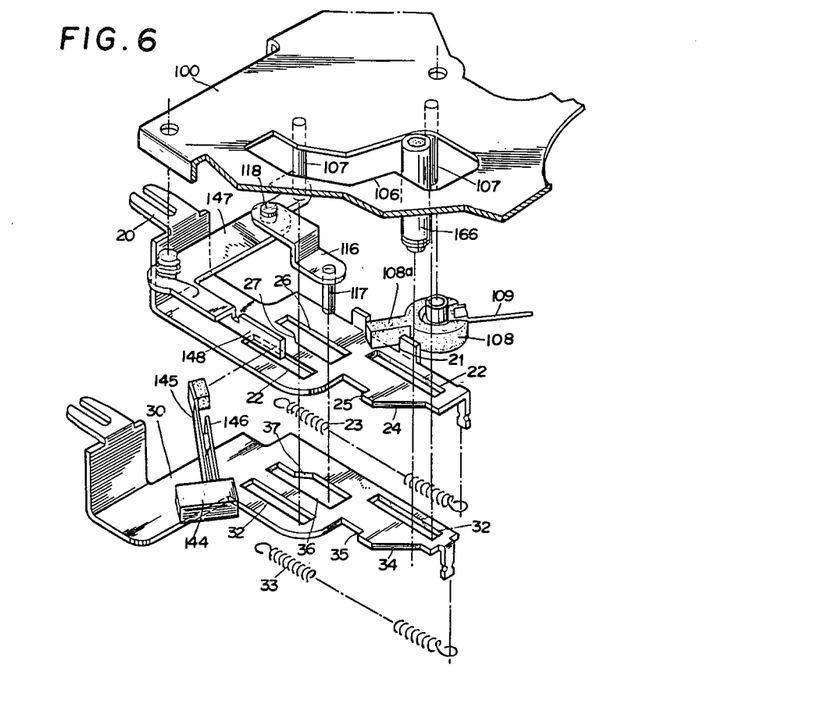
FIG. 6 is an exploded perspective view of components associated with respective operating levers.

As mentioned above, the operating levers 20 and 30 are disposed so that their respective guide slots 26 and 36 may register each other and the slots 26 and 36 have throats 27 and 37, respectively, which are formed symmetrical each other as illustrated in FIG. 6. In the guide slots 26 and 36 is inserted the engaging pin 117 of the link 116 pivotally connected at the base end thereof to the bottom of the deck 100. Another switch mechanism 144 incorporated in an electric circuit of the electromagnetic mechanism 66 is provided on the deck 100. The switch mechanism 144 has a movable contact member 145 which is adapted to abut against an operating portion 148 of an L-shaped member 147. The L-shaped member 147 is pivotally supported intermediate thereof on the bottom of the deck 100 and pivotally connected at an end thereof by a shaft 118 to one end portion of the link 116. When both the operating levers 20 and 30 are depressed, the engaging pin 117 is displaced while being held between the throats 27 and 37 as illustrated in FIG. 7 (D). The L-shaped member 147 is then rotated around 149 to release the movable contact member 145 from a contact 146 by the operating portion 148. As a result, the electromagnetic mechanism 66 is deenergized to allow an eject operation.

Figure 7A:
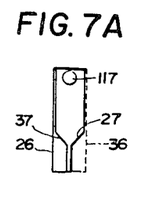
Figure 7B:
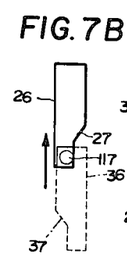
Figures 7C, 7D:
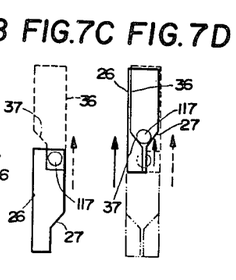
Figure 8:
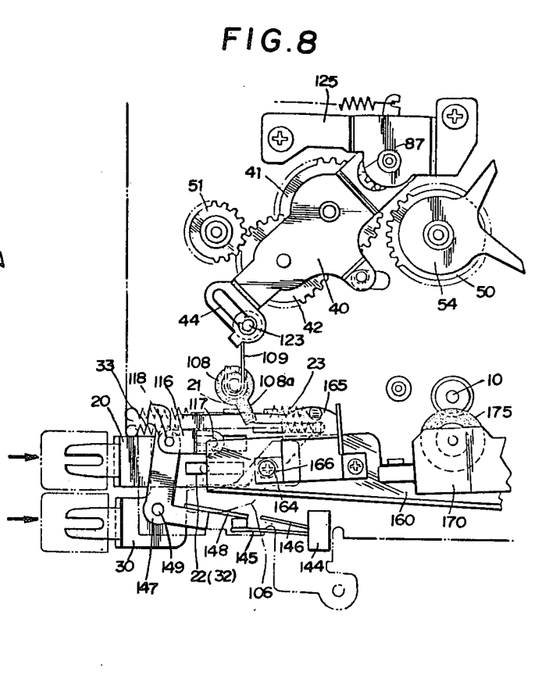
FIG. 8 is a plan view showing an operational state where the operating levers have been depressed concurrently.
Figure 9:
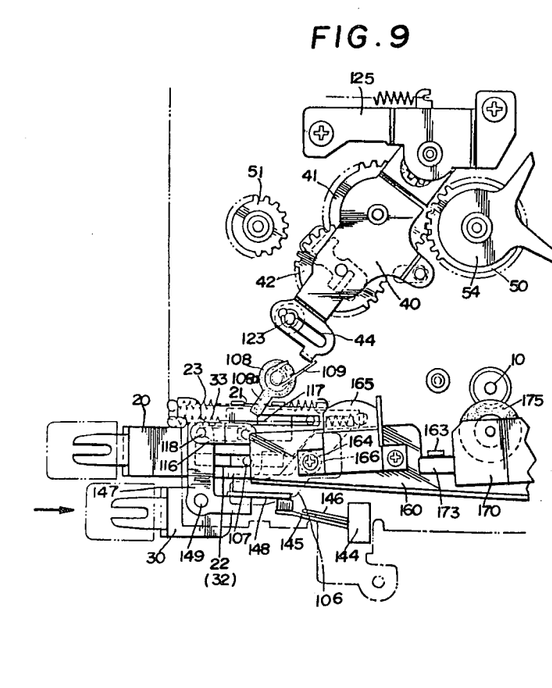
FIG. 9 is a plan view showing an operational state where the second operating lever has been depressed.

The operational relation between the guide slots 26 and 36 are as illustrated in FIG. 7. When neither of the operating levers 20 and 30 are depressed, the throats 27 and 37 and the engaging pin 117 are in a relation as illustrated in FIG. 7 (A). The case where one of the operating levers 20 and 30 is depressed is illustrated in FIGS. 7 (B) and (C). The engaging pin 117 is biased to one side but not displaced backwardly. By contrast, when both the operation levers 20 and 30 are depressed, the engaging pin is pinched between the throats 27 and 37 and brought backwardly to effect the eject operation.

The eject operation will now be explained. Upon depression of the first operating lever 20, the rock member 108 is rotated through its projection 108a received in the engaging portion 21. The changeover plate 40 is then displaced from the position of FIG. 4 to the position of FIG. 5 to bring the interlocking rotator 42 into mesh with the small gear 51. At the same time, the diagonal edge 24 of the lever 20 acts on the operating shaft 166 to retract the head plate 160 and the pinch roller frame 170, establishing a reverse feed mode. On the other hand, upon depression of the second operating lever 30, the diagonal edge 34 acts to retract the head plate 160 and the pinch roller frame 170. Therefore, the tape feed by the capstan is cancelled and driving by the reel drive member 122 becomes operative. The tape feed by the reel drive member is carried out at a speed higher than that by the capstan 10. Thus, a fast feed mode is established. Furthermore, by depressing the operating levers 20 and 30 concurrently, the engaging pin 117 is moved backwardly to open the switch mechanism 144 and deenergize the electromagnetic mechanism 66 for carrying out the eject operation.

In accordance with the present embodiment of the invention, a rewind operation and a fast feed operation can be established by the first and the second operating lever, respectively. In addition, an eject operation can also be effected by depressing the first and the second operation levers concurrently. Thus, three functions conventionally carried out by three operating levers can be effected by two operating levers, simplifying the structure of the entire mechanism. Furthermore, the embodiment has such an advantage that possible damage or deformation caused in the known mechanism by misoperation such as concurrent depression of two levers can be eliminated.

In another preferred form of the tape player of the invention, a further improved eject mechanism is employed.

In a known tape player capable of effecting an eject operation, the eject operation is associated with displacement of a head and a pinch roller relative to a loaded cassette. Therefore, a mechanism for carrying out the eject operation is generally combined with or superposed on a mechanism for displacing, more specifically, advancing and retracting the head and the pinch roller. This causes increase in thickness of a portion of the tape player where the mechanism associated with the displacement of the head and the pinch roller is combined with or superposed on the mechanism associated with the eject operation. The entire thickness of the tape player is also increased. This is not desirable for a car tape player mounted on a car. Furthermore, to effect the eject operation for a cassette which is ordinarily adapted to be subjected to such an eject operation, it is essential to lift, relative to a deck, a cassette loading base or a lift base having reel bases thereon. To this end, in general, shaft members are employed as guide means for carrying out the lifting operation accurately. Such shaft members, however, require a considerable operating space so that the entire size of the tape player becomes large. Although the guide means may have a structure commonly utilizable for other mechanisms in the tape player for reducing the size of the tape player, in such a case, it is difficult to expect accurate operation of the mechanisms. This possibly prevents smooth operation of the tape player. Moreover, where interlocking links are employed for an interlocking system, the entire structure of the tape player becomes bulky.

Therefore, in the preferred form of the tape player of the invention, to obviate the disadvantages of the known tape player, the mechanism for displacement of the head and the pinch roller and the mechanism for lifting and lowering the cassette loading base are separated from each other and disposed on opposite sides of a cassette loading area formed centrally in the tape player.

Figure 10:
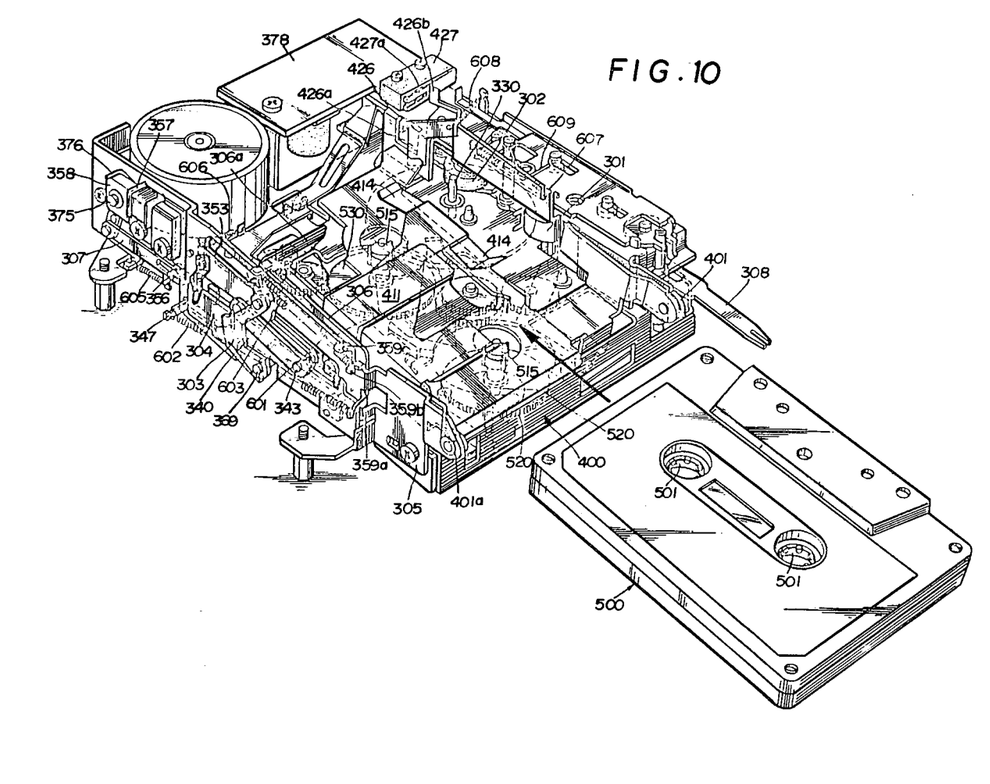
FIG. 10 is a perspective view of another form of a tape player in accordance with the present invention.
Figure 11:
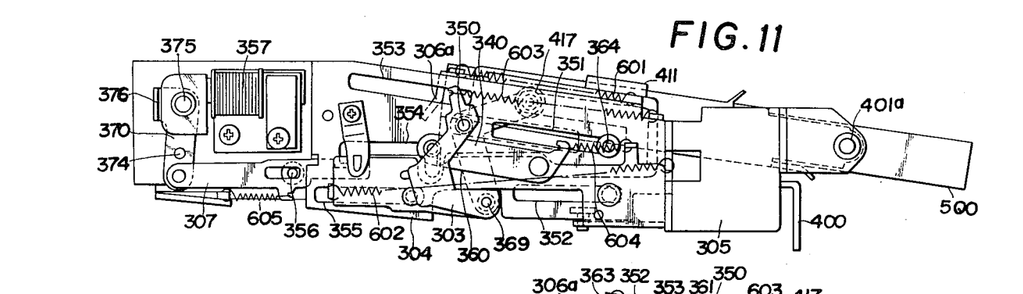
FIG. 11 is a side view of the tape player illustrated in FIG. 10, showing a state where a tape pack is ready to be inserted.

More specifically, as illustrated in FIG. 10, a deck 400 bent downwardly at a cassette loading entrance portion has a pivotal seat 401 at a forward side portion and has a pivotal seat 401a at a forward end portion of a guide plate 305 fixed to another side of the deck 400 so as to oppose to the pivotal seat 401. Guide portions 410 formed at opposite ends of a cassette receiving frame 310 forming a cassette loading area therebetween are pivotally connected to the pivotal seats 401 and 401a. The receiving frame 310 has a structure illustrated in an exploded state in FIG. 15. A rigid pressing plate 411 and a resilient thin member 412 are superposedly provided on one side of the cassette receiving frame 310. The pressing plate 411 is bent in an L-shape as illustrated in FIG. 15 and the resilient member 412 has an entrance pressing portion 413 and intermediate pressing portions 414, 414 formed at a portion extended farther than a tip end of the pressing plate 411 for resiliently pressing a cassette 500 loaded as illustrated in FIGS. 10 and 11 against the receiving frame 310.

The cassette receiving frame 310 further has, at its bottom portion, openings 415 for receiving reel engaging members 515, respectively, a projected portion 416 formed by bending an entrance portion of the receiving frame 310 and a projection 417 at a rear portion thereof. A tip end of the projection 417 engages with a first slot 361 of a slide member 306 attached to the guide plate 305. The projection 417 is further fitted in a hole 368 formed at one end portion of an L-shaped operating member 360 interposed between the receiving frame 310 and the slide member 306. A washer 367 is loosely fitted between the slide member 306 and the L-shaped operating member 360 to reduce a friction between the slide member 306 and the operating member 360.

Figures 12, 13:
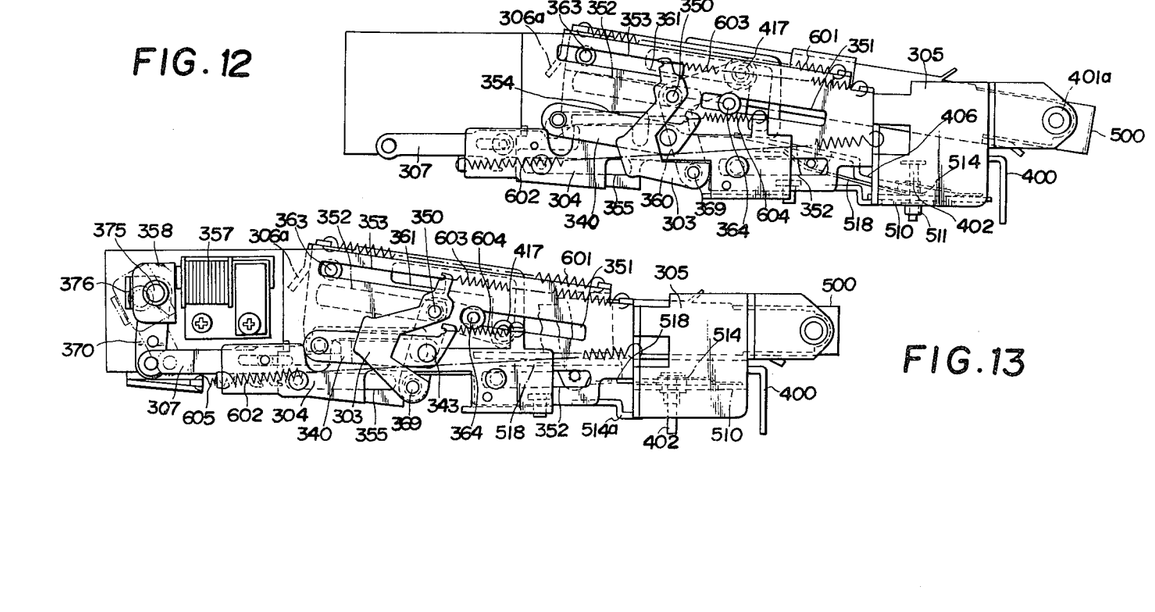
FIG. 12 is a similar side view showing a state where the tape pack is loaded into the rearmost position while assuming an inclined position.
FIG. 13 is a similar side view showing a state where the tape pack is put down onto a deck.
Figure 14:
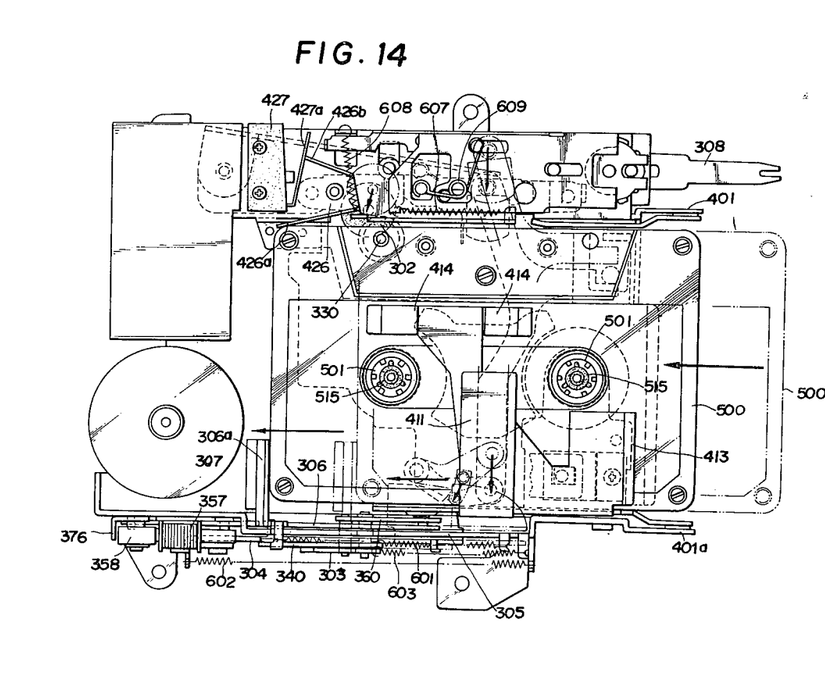
FIG. 14 is a plan view of the tape player illustrated in FIG. 10.

The guide plate 305 has an important function in the lifting and lowering operation of the receiving base 310 and is firmly fixed to the deck 400 by screws 455 as illustrated in FIGS. 10 and 13. The slide member 306 has the first engaging slot 361 with a bent portion 361a as illustrated in FIG. 15 and has a second engaging slot 362. A pin 350 provided at an intermediate position of the guide plate 305 is inserted through the second slot 362 and further inserted into a hole 360a formed at a corner of the operating member 360. The slide member 306 has a receiving portion 306a bent in an L-shape at a rear end portion of the slide member 306. The slide member 306 further has, at its position forward of the second engaging slot 362, a pin 364 which is engageable with a first guide slot 351 formed at a forward portion of the guide plate 305 and has, at its rearward position, another pin 363 which is engageable with a third guide slot 353. The guide slots 351 and 353 extends rearwardly inclining slightly upwardly. An engaging portion 366 is formed at a rear lower portion of the slide member 306 which is adapted to engage with and disengage from a pin 340a of an actuator 340 as will be described in detail later.

Figure 15:
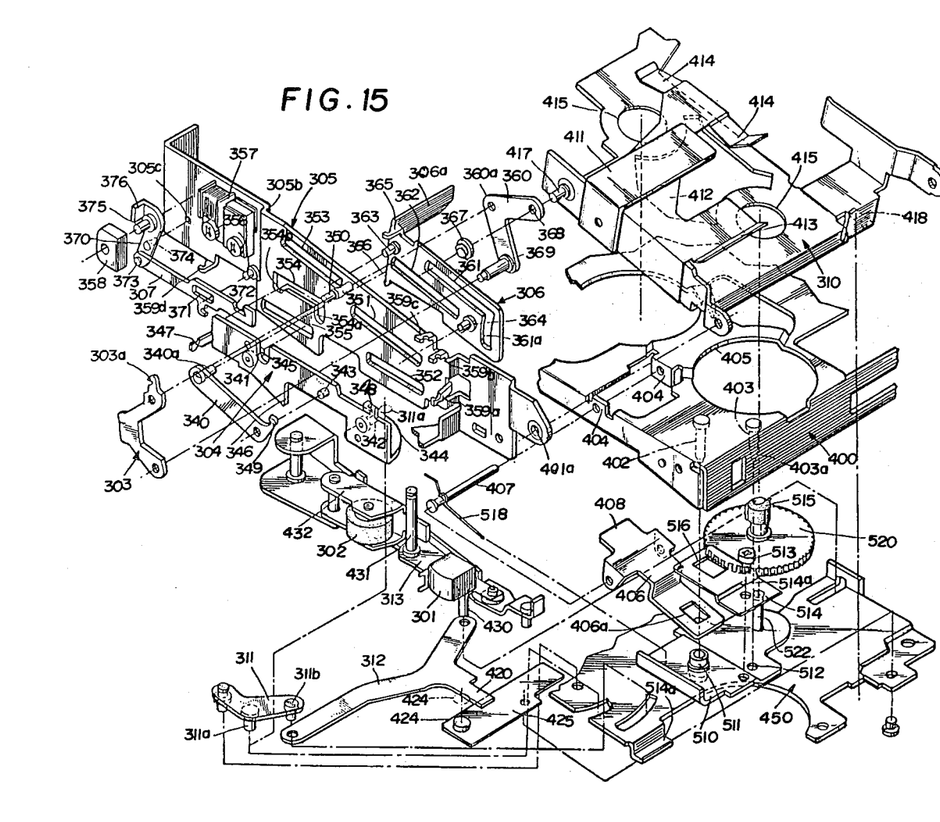
FIG. 15 is an exploded perspective view of main components of the tape player illustrated in FIG. 10.

The guide plate 305 further has a second guide slot 352 at a forward lower portion and a fourth and a fifth guide slot 354 and 355 at rearward lower portions as illustrated in FIG. 15. The second and the fifth guide slot 352 and 355 are adapted to receive pins 342 and 345 formed on a slide member 304 attached to the outside of the guide plate 305, respectively, so as to guide sliding of the slide member 304. The fourth guide slot 354 has guide portions 354a and 354b formed so as to extend downwardly and is engageable with the pin 340a provided at the rear portion of the actuator 340 rotatably attached by a pivot 343 to the outside of the slide member 304. The slide member 304 has a cutout 341 for allowing a vertical movement around the pivot 343, of the pin 340a engaged with the fourth guide slot 354. A horizontal cam portion 344 is formed at a forward portion of the slide member 304 so as to be in parallel with the bottom of the deck 400. An engaging portion 346 is formed at a lower portion of the slide member 304 so as to extend downwardly therefrom. A spring 602 is provided between a rest 347 formed at the rear end of the slide member 304 and a first rest 359a of the guide plate 305. Another spring 604 is also provided between a rest 348 formed on a forward upper portion of the slide member 304 and a rest 349 formed at a forward end portion of the actuator 340 as illustrated in FIGS. 11 to 13.

A connecting member 369 provided at a lower portion of the L-shaped operating member 360 is connected to a lower portion of an interlocking member 303 as illustrated in FIG. 15 disposed outer than the actuator 340. An upper portion of the interlocking member 303 is pivotally supported by a pin 350 of the guide plate 305. A further spring 603 is provided between a rest 303a formed at a position upper than the pivotal support portion and a second rest 359b of the guide plate 305. The guide plate 305 has a stepped portion 305b at its rearward portion and has an electromagnetic mechanism 357 at a position rear of the stepped portion 305b. A pin 356 is provided on the guide plate 305 at a position lower than the electromagnetic mechanism 357 and engaged with a guide slot 371 of an interlocking link 307. The interlocking link 307 has, at a position forward of the stepped portion 405b, a recessed lock portion 372 adapted to engage with the pin 340a. A rear end of the interlocking link 307 is connected to a lower end of an attractable member bracket 370 by a connecting member 373. The bracket 370 has intermediate thereof a pivot 374 projected inwardly and received in a slot 305c formed at a rear portion of the guide plate 305. An attractable member 358 is tiltably mounted by a shaft 375 provided at an upper portion of the bracket 370. A stopper 376 is formed adjacent to the shaft 375 so as to restrain excessive rotation of the attractable member 358 around the shaft 375.

A rotatable member 311 is pivotally connected at its one end to an auxiliary deck 450 fitted to a lower face of the deck 400. A pin 311a projected downwardly from a central portion of the rotatable member 311 is adapted to abut on the cam portion 344 of the slide member 304. The rotatable member 311 has a connecting member 311b at its tip portion for connection with one end of an interlocking rod 312. Another end of the interlocking rod 312 is connected to a pin 430 on a lower face of a head plate 313 having the head 301 mounted thereon. A shaft 431 provided at a central portion of an upper face of the head plate 313 is engaged with a tip end of a pinch roller frame 432 having a pinch roller 302 mounted thereon. A spring 433 is provided on the shaft 431 as illustrated in FIGS. 10 and 13 to urge free ends of the head plate 313 and pinch roller frame 432. The interlocking rod 312 further has an engaging portion 420 which is adapted to engage with a pin 424 of a resilient member 425 connected at its one end to the bottom of the auxiliary deck 450. The resilient member 425 is adapted to engage with an operating portion 418 formed at a forward side portion of the receiving frame 310 at a position suitably distanced from the pivotal seat 401 of the frame 310. When the receiving frame 310 is lowered, the operating portion 418 depresses the resilient member 425 to release the engagement between the pin 424 and the engaging portion 420.

Guide shafts 402 and 403 are provided on the deck 400 at a forward portion thereof and connected to a reel base bed 510 illustrated in FIG. 15. More specifically, the guide shaft 402 is fitted in a cylindrical guide 511 provided on the reel base bed 510 for guiding the up and down movement of the bed 510. The guide shaft 403 is fitted in an opening 512 and acts to prevent rotation of the bed 510 when the bed 510 is moved up and down. A reel base 520 having a reel drive member 515 is rotatably supported at one end portion of the reel base bed 510. An engaging plate 514 is fixed by a screw 513 to the reel base 520. The engaging plate 514 has a stepped portion 514a and an opening portion 516. Pivotal seats 404, 404 are provided on the deck 400 at positions adjacent to a reel base opening 405. An actuating member 406 pivotally connected at its one end to the pivotal seats 404, 404 by a pin 407. A tip end of the actuating member 406 is fitted to the opening portion 516. More specifically, a square slot 406a formed on the tip end of the actuating member 406 registers the opening portion 516 of the engaging plate 514 and receives the guide 511 and the guide shaft 402. A base end 408 of the actuating member 406 is raised over the deck 400 at a position rearward of the pivotal seats 404, 404 so as to engage with the lower face of the receiving frame 310.

A switch operating member 426 is rotatably provided at a rear side portion of the deck 400 and has a receiving portion 426a which is adapted to be urged into the rear portion of the cassette loading area by the action of a spring. An operating portion 426b of the switch operating member 426 is adapted to engage with an operating portion 427a of a switch 427. A reel base 530 is provided oppositely to the reel base 520 and has a magnet member 531 which is provided with a reed switch 532 for detecting a rotation of the reel base 530. Thus, when a signal of stop of the reel base 530 is obtained, a transistor connected in a printed circuit board 375 illustrated in FIG. 10 is operated to open the electric circuit for the electromagnetic mechanism 357.

The switch 427 is adapted to be opened also upon depression of an eject lever 308 provided at a side portion of the tape player. More specifically, when the eject lever 308 is depressed, an interlocking member 380 is also depressed conjointly. An operating portion 381 formed at a rear end of the interlocking member 380 may operate the operating portion 427a of the switch 427 so as to open the switch 427 which has been closed by the loading of the cassette 500. The opening of the switch 427 effects a series of eject operation as will be mentioned in detail later. Thus, the eject lever 308 forms a manual eject mechanism. The eject lever 308 is disposed at a position above the head plate 313 and opposite to the guide plate 305. A operating rod 383 engages with the longitudinal slot 382 formed on the lever 308 and further engages with a recess 388 of a rotatable member 384 connected by a shaft 389. Projections 385 provided on opposite sides of the rotatable member 384 is adapted to abut on a slide plate 386. When the lever 308 is pivoted, the slide plate 386 is retracted backwardly. The slide movement of the slide plate 386 and operations associated therewith establish a fast feed and a rewind mode. 387 is a spring for resetting the slide plate 386.

Although in the embodiment as described above, a pulling type electromagnetic mechanism is employed, other type electromagnetic mechanism may alternatively be employed. As to the cassette loading base, a slot-in type system wherein a cassette loading base is lifted or lowered horizontally may be employed instead of the tilt type loading system as mentioned above. In this case, only by suitably adapting the arrangement of the guide slots of the guide plate 305 and the components associated therewith for the system, the invention becomes operative and can provide desired effects of the present invention.

The eject operation of this embodiment will now be described. As illustrated in FIGS. 10 to 12, when the cassette 500 is loaded into the receiving frame 310 raised around the pivotal seats 401, 401a at the rear end position thereof, the rear end of the cassette 500 is brought into contact with the engaging portion 306a of the slide member 306 to push the slide member 306 backwardly against an action of a spring 601. The slide member 306 is guided diagonally upwardly along the inclinations of the guide slots 351 and 343. At the same time of the sliding of the slide member 306, an engaging portion 366 engages with the pin 340a of the actuator 340 and the actuator 340 is displaced backwardly. Another slide member 304 coupled to the actuator 340 by a pin 343 is also displaced backwardly conjointly against the action of the spring 602. Thus, an ejecting force is stored by the spring 602. During the displacement, since the spring 604 is provided between the actuator 340 and the slide member 304, the actuator 304 has a rotating force in a clockwise direction in a state of FIG. 11 or 12.

When the pin 340a displaced backwardly as mentioned above reaches the rear end of the fourth guide slot 354 and the engaging portion 366 of the slide member 306 is displaced diagonally upwardly, the engaging portion 366 of the slide member 306 is displaced diagonally upwardly, the engaging portion 366 is lifted relative to the pin 340a. Then, an arcuate portion 366a formed at a tip end portion of the engaging portion 366 acts on a circumferential face of the pin 340a to press the pin 340a downwardly and bring it into a guide portion 354b of the guide slot 354. During this process, the pin 340a acts on an end 377 of the interlocking link 307 positioned inside of the guide portion 354b to put the attractable member 358 into contact with the electromagnetic mechanism 357 through the interlocking link 307. On the other hand, upon insertion of the cassette 500 into the interior of the tape player, the rear end of the cassette 500 pushes the switch operating member 426 to close the switch 427 for energizing the electromagnetic mechanism 357. Therefore, the attractable member 358 in contact with the electromagnetic mechanism 357 is held at the position. The pin 340a is held in a lock portion 372 to establish a lock condition. After establishment of the lock condition, the engaging portion 366 of the slide member 306 passes over the pin 340a and displaced backwardly until the pin 417 reaches the bent portion 361a of the first engaging slot 361 of the slide member 306. Then, another interlocking member 303 clockwise as viewed in FIG. 12 by the action of the spring 603, so that the rear portion of the receiving frame 310 is lowered onto the deck 400 through the projection 363 to set the cassette 500 into a recording-/reproducing position.

When the receiving frame 310 with the cassette 500 loaded therein is lowered onto the deck 400, an operating portion 418 provided on a lower face of the receiving frame 310 depresses a resilient member 425. The engaging portion 420 of the interlocking rod 312 which has been engaged with a projection 424 of the resilient member 425 is released, and the head plate 313 is displaced by the action of a spring 309. The head 301 and the pinch roller 302 are caused to advance to press against a tape of the cassette now set in the recording-/reproducing position. The tape is driven between the pinch roller 302 and a capstan 303 which has been driven by a motor 331 through the switch 427 in a closed position. Thus, in accordance with the present embodiment, the operation of the head plate 313 is carried out under the conditions where the setting of the receiving frame 310 and the cassette 500 into their recording/reproducing positions is detected by the operating member 418 and the resilient member 425. Accordingly, the timing of the operations is always proper and the displacement of the head plate does never operate before the cassette has been set in the recording/reproducing position. Thus, there is no possibility of misoperation. As mentioned above, when the receiving frame 310 is put down onto the recording/reproducing position, the lower face thereof presses down the base end portion 408 of the operating member 406 at a position raised upper than the face of the deck 400 to raise a tip end portion having the opening 406a. As a result, the reel base bed 510, the reel base 520 on the bed 510 and the reel drive member 515 are raised through the engaging plate 514. Thus, the reel drive member 515 located at the entrance portion which has been at a lowered position so as not to hinder the cassette 500 when the cassette is loaded is raised to be put into the reel of the cassette 500. With this structure, the thickness of the tape player can be reduced by at least a thickness corresponding to a raising stroke of the reel drive member 515 etc.

When the rear reel base 530 of the tape player which has been in a reproducing mode stops its operation by a tape end detected signal or by a rewind operation, the energization of the electromagnetic mechanism 357 is stopped by a detection signal obtained by a reed switch 532. Upon release of attraction of the electromagnetic mechanism 357, the engagement between the lock portion 372 of the interlocking link 307 and the pin 345 is cancelled. The slide member 304 returns to its original forward position by a restoring force stored by the spring 602. At an early stage of this restoration, the cam portion 344 acts on the pin 311a to retract through the interlocking rod 312 the head plate 313 from an advanced position where the head and the pinch roller are advanced into the cassette. Then, the engaging portion 346 of the L-shaped operating member 360 to rotate the operating member 360 counterclockwise and to raise the rear portion of the receiving frame 310 connected through the hole 368. Since the engaging portion 420 of the interlocking rod 312 is also restored in the course of retreat of the head plate 313 and the depression by the operating portion 418 onto the resilient member 425 is also released by raising the receiving frame 310, the engaging portion 420 is again brought into engagement with the projection 424 of the resilient member 425 restored from the depressed position. Thus, the head plate 313 is positively held at the retracted position thereof when the rear portion of the cassette 500 and the receiving frame 310 are in the raised positions. When the receiving frame 310 reaches the fully raised position thereof, the connecting member 369 is displaced to the upper end of the bent portion 361a of the first engaging slot 361. Then, the slide member 306 is restored to its original position by the restoring action of the spring 601. More particularly, the restoration of the slide member 306 puts the connecting member 369 into the horizontal portion of the engaging slot 361 and pushes the cassette 500 in the loaded position forwardly by the rear end engaging portion 306a to complete the eject operation.

According to the embodiment as mentioned above, the head plate having the head mounted thereon and displaceable towards and from the cassette loading area is provided on one side of the deck, and the guide plate provided with the slide member adapted to slide engaging with the loaded cassette for carrying out the eject operation is provided on another side of the deck. Thus, the head plate and the eject operation mechanism are disposed on opposite sides of the deck so that the thickness of the tape player can be reduced as compared with the known tape player wherein the head plate and the eject operation mechanism are superposed each other on the deck. In addition, the slide member is adapted to slide along the guide slot of the guide member, which is desirable to effect eject operation smoothly and accurately. Thus, the structure of the present embodiment is suitable especially for a car tape player.

We claim:

1. A tape player which comprises: magnetic recording/reproducing means for recording signals on or reproducing signals recorded on the tape in a cassette in a recording/reproducing position; a cassette-receiving frame; slide means adapted to slide rearwardly on said frame under the force of a tape cassette pushed rearwardly thereinto; lift means for effecting the placement of means adjacent to said cassette to effect a tape feeding operation in a raised or lowered position thereof and is initially located in the other position; engaging means provided on said lift means and engaged by said slide means upon rearward movement thereof in said frame so that the lift means is moved from its initial lowered or raised position to the other of said positions as said slide means is moved to the rear of said frame; lock means having a lock part which locks said lift means in the latter position and said slide means in a rearwardmost position when the slide means has been moved to its rearwardmost position where the cassette is in a position preparatory to a recording/reproducing operation; attractable means connected to said lock means; electromagnetic means; switch means provided for energizing said electromagnetic means in response to the sliding of said slide means toward said rearwardmost position; and said attractable means being attracted by said electromagnetic means when said electromagnetic means is energized to complete the movement of said lock means to its final locking position, the attracting force of said electromagnetic means aiding in the completion of the movement of said lock means to its final locking position and the movement of said lift means and slide means to their locked positions during a cassette insertion operation, to reduce the force necessary to move said cassette into a position preparatory for a recording/reproducing operation.

2. A tape player of claim 1, which further comprises first manually operating lever means provided on said deck for effecting a first mode of operation; second manually operating lever means juxtaposed with said first manually operating lever means for effecting a second mode of operation respectively, said first and said second operating means having guide slots having throat portions formed symmetrically with respect to each other; actuating means having an engaging pin received in said guide slots and effecting a third mode of operation when moved along a first path, said engaging pin being adapted to slip by said throat portions upon operation of either one of said first and said second operating lever means so it does not traverse said first path, and being adapted to be pinched between the symmetrically located throat portions upon conjoint operation of said first and second operating lever means to be moved along said first path to effect said third mode of operation.

3. A tape player of claim 2, wherein said first operating lever means is adapted to operate a fast feed mechanism for the cassette.

4. A tape player of claim 2, wherein said second operating lever means is adapted to operate a rewind mechanism for the cassette.

5. A tape player of claim 2, wherein there is an eject mechanism for the cassette, said eject mechanism being actuated upon conjoint operating of said first and said second operating lever means.

6. A tape player of claim 2, which further comprises a tape drive motor, first and second reel drive means on said deck, movable changeover means movable from an initial position to a changeover position by operation of one of said operating lever means; and a first and a second rotator interlocked respectively with said first and second reel drive means when said changeover means is respectively in said initial and changeover positions.

7. A tape player of claim 1, which further comprises a stopper formed on said lock means so as to prevent over-rotation of said attractable member.

* * * * *